US005594887A

United States Patent [19]
Osaka

[11] Patent Number: 5,594,887
[45] Date of Patent: Jan. 14, 1997

[54] MAIN MEMORY CONTROLLER RESPONSIVE TO SIGNALS INDICATIVE OF OWNED AND UNOWNED STATUS

[75] Inventor: Masataka Osaka, Osaka, Japan

[73] Assignee: Matsushita Electric Inductrial Co., Ltd., Osaka, Japan

[21] Appl. No.: 332,759

[22] Filed: Nov. 1, 1994

[30] Foreign Application Priority Data

Nov. 4, 1993 [JP] Japan .................................. 5-275725

[51] Int. Cl.$^6$ .................................................. G06F 12/08
[52] U.S. Cl. ......................................... 395/471; 395/472
[58] Field of Search .................................... 395/468–473, 395/447–451

[56] References Cited

U.S. PATENT DOCUMENTS 5,222,224  6/1993  Flynn et al. .
5,241,664  8/1993  Ohba et al. .
5,297,269  3/1994  Donaldson et al. ................... 395/472
5,394,555  2/1995  Hunter et al. .

Primary Examiner—Matthew M. Kim
Attorney, Agent, or Firm—Beveridge, Degrandi, Weilacher, and Young, L.L.P.

[57] ABSTRACT

In a system bus connected to at least one CPU having a cache memory used for increasing memory access speed in an engineering workstation or the like, a main memory controller including a status memory for storing owned and unowned statuses in a main memory and a cache memory of data associated with an access operation to a system bus connected to at least one CPU having a cache memory performed by an access means of a CPU or the like, a memory control portion which is responsive to signals indicative of the stored statuses for reading the data in the main memory before the time for outputting a data invalidating signal from the cache memory elapses in the case of the owned status and for reading the data in the cache memory after the data invalidating signal is output in the case of the unowned status, and a status rewrite control portion for monitoring accesses to the system bus and for rewriting the status in the status memory according to the result of the monitoring.

4 Claims, 6 Drawing Sheets

MAIN MEMORY CONTROLLER RESPONSIVE TO SIGNALS INDICATIVE OF OWNED AND UNOWNED STATUS

BACKGROUND OF THE INVENTION

1. Field of the Invention

The present invention relates to a main memory controller used in controlling a main memory connected to an engineering workstation or the like having a single CPU or multi-CPU configuration,

2. Description of the Related Arts

An engineering workstation or the like generally has a cache memory between a main memory and a CPU thereof to increase memory access speed. When such a cache memory keeps data which have been rewritten (owned status), the data must be output from the cache memory after the output of data from the main memory is invalidated to allow readout from the bus master of another CPU, an I/O controller, or the like.

Such a conventional main memory controller can not output data until the latest timing at which a signal for invalidating data in the main memory may be output from the cache memory in response to an access to the CPU. Thus, the speed of the access from the CPU to the main memory is delayed by the time required for determining the presence of data in the cache regardless of whether the cache memory stores data or not, which results in the problem that there is reduction in the efficiency of data transfer corresponding to such a delay.

SUMMARY OF THE INVENTION

Taking such a problem in the prior art main memory controllers into consideration, it is an object of the present invention to provide a main memory controller wherein the efficiency of data transfer can be improved by allowing data transfer at the access speed of a main memory to eliminate unnecessary delay if the data in the main memory is owned by the main memory.

In order to achieve the above-described object, the present invention provides a main memory controller including a status memory for storing owned and unowned statuses in a main memory and a cache memory of data associated with an access operation to a system bus connected to at least one CPU having a cache memory performed by an access means of the CPU or the like, a memory control portion which is responsive to signals indicative of the stored statuses for reading the data in the main memory before the time for outputting a data invalidating signal from the cache memory elapses in the cache memory in the case of the owned status and for reading the data after the data invalidating signal is output in the case of the unowned status, and a status rewrite control portion for monitoring accesses to the system bus and for rewriting the status in the status memory according to the result of the monitoring.

With the above configuration, the status memory stores owned and unowned statuses in a main memory and a cache memory of data associated with an access operation to the system bus performed by an access means of the CPU or the like; the memory control portion reads the data in the main memory before the time for outputting the data invalidating signal from the cache memory elapses in the case of the owned status and reads the data in the cache memory after the data invalidating signal is output in the case of the unowned status; and the status rewrite control portion monitors accesses to the system bus and rewrites the status in the status memory according to the result of the monitoring. This allows data transfer to be performed at the access speed of the main memory without unnecessary delay if no cache keeps data, resulting in the advantage that the efficiency of data transfer can be improved.

According to another aspect of the present invention, if an address decoder is provided, the status memory can keep on operating properly with its capacity left unchanged regardless of the capacity of the main memory. This provides an advantage in that there is no need for expanding the status memory even if the main memory is expanded.

DETAILED DESCRIPTION OF THE PREFERRED EMBODIMENTS

Figure 1:
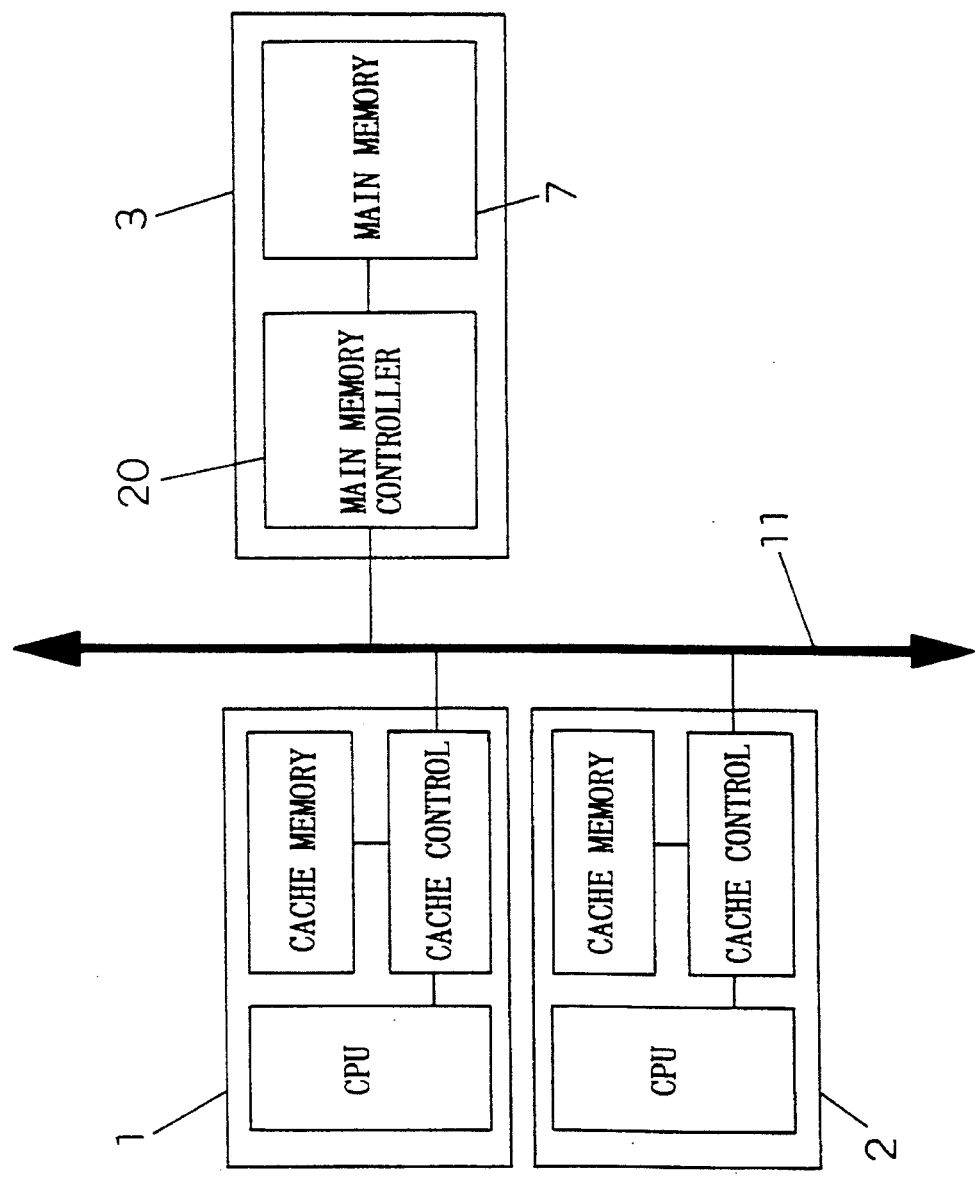
FIG. 1 is a block diagram schematically illustrating a configuration of a multi-CPU system including a main memory controller according to a first embodiment of the present invention.
Figure 2:
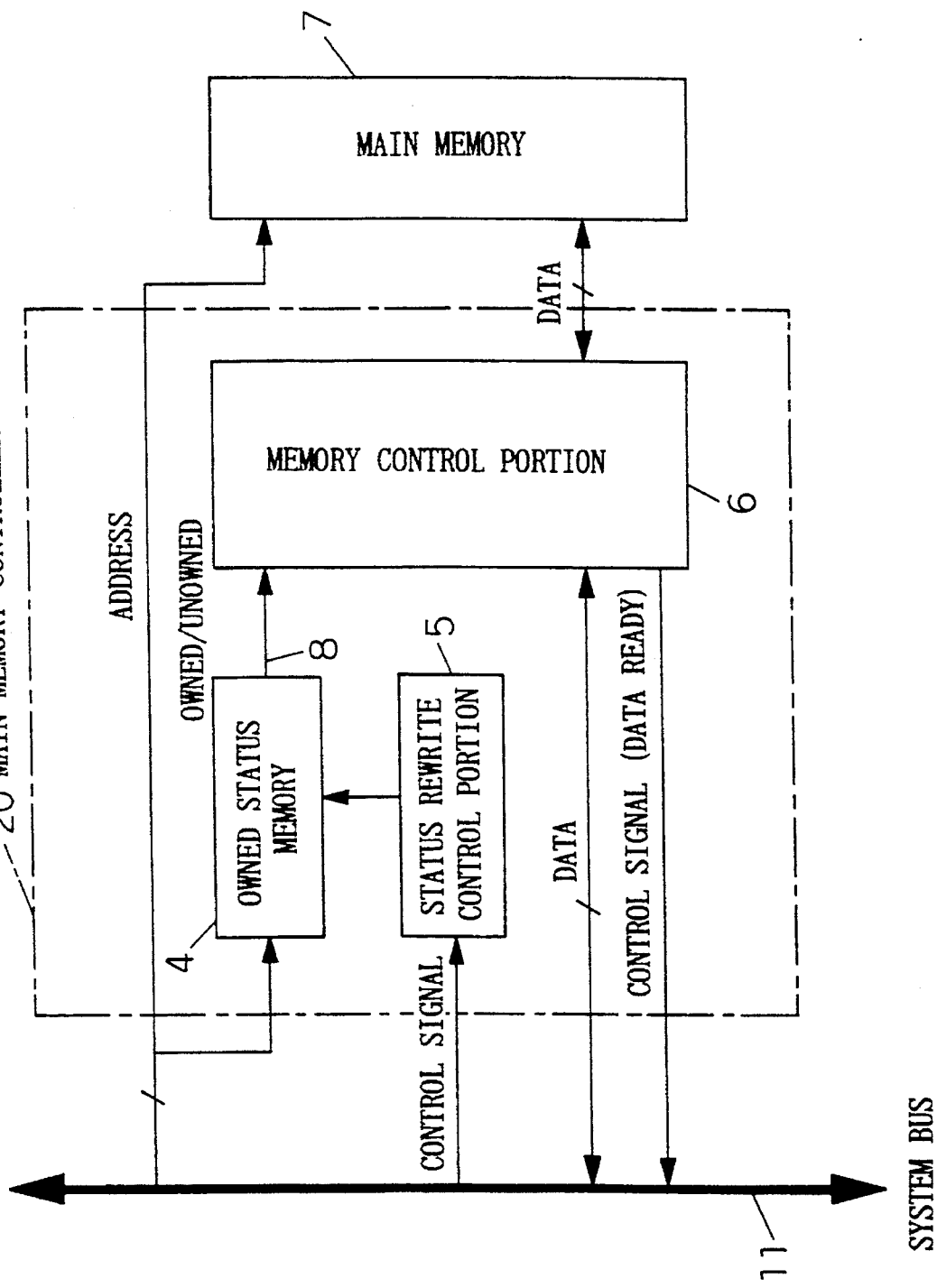
FIG. 2 is a block diagram illustrating a configuration of the main memory controller in the first embodiment of the present invention.

The present invention will now be described with reference to the accompanying drawings illustrating preferred embodiments thereof. FIG. 1 is a block diagram schematically illustrating a configuration of a multi-CPU system including a main memory controller according to a first embodiment of the present invention. In FIG. 1, reference numerals 1 and 2 represent CPU modules connected to a system bus 11, and reference numeral 3 represents a main memory portion including a main memory controller 20. FIG. 2 is a block diagram illustrating the detailed configuration of the main memory controller 20 in FIG. 1. In FIG. 2, reference numeral 4 represents a status memory for storing the status of the ownership of data kept by a main memory 7; reference numeral 5 represents a status rewrite control portion for watching accesses on the system bus 11 and for rewriting the owned status in the main memory 7 (for rewriting the contents of the owned status memory); reference numeral 8 represents signals indicating whether the data for one line including an address output during a readout from the CPUs or the like are in an owned status or an unowned status (there is a possibility that the data have been rewritten because they are in caches in the CPUs): and reference numeral 6 represents a memory control portion for controlling the timing at which the read data are output in accordance with the owned/unowned signals 8. The above-described owned status memory 4 is a status memory. The operation of the status rewrite control portion 5 in FIG. 2 will now be described with reference to FIG. 3.

Figure 3:
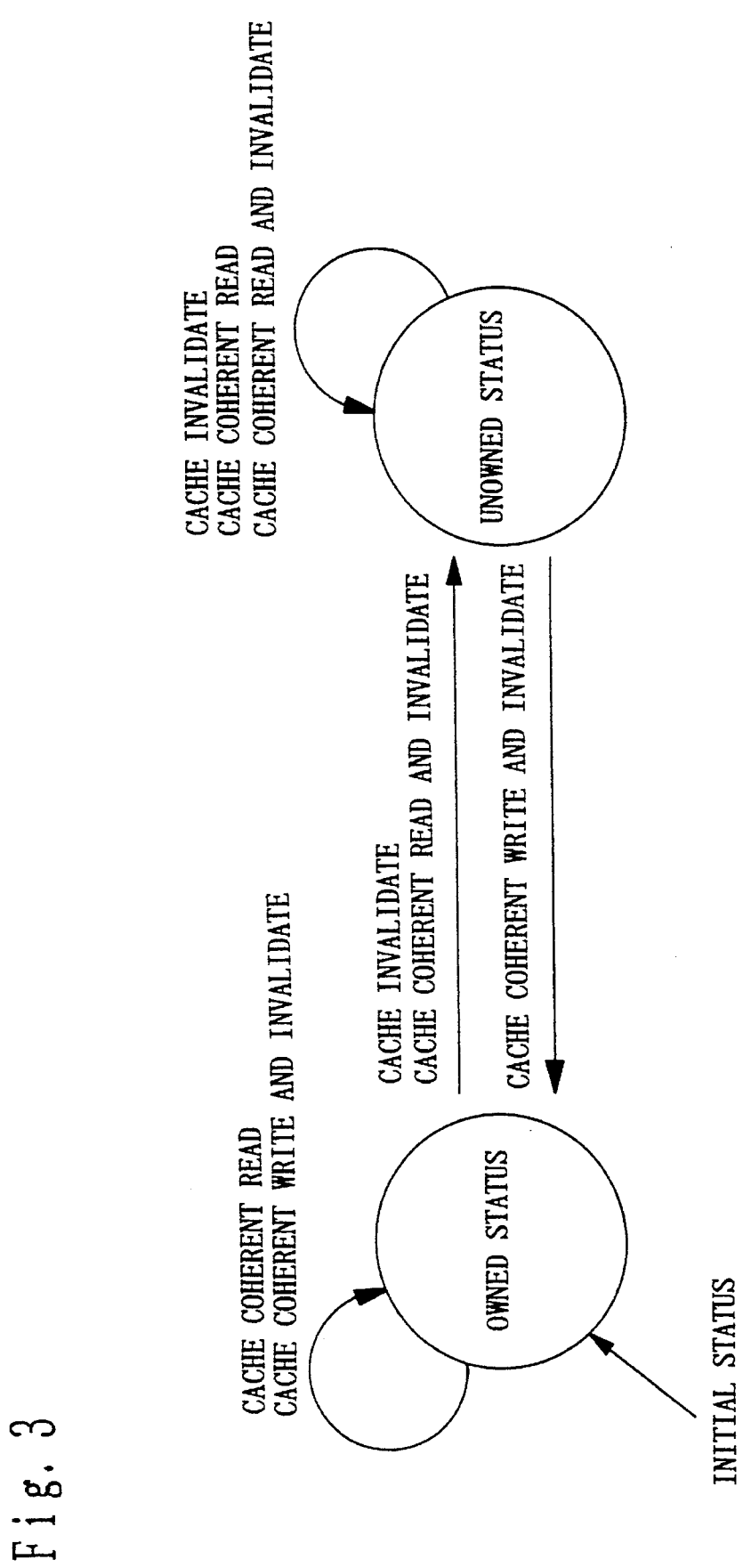
FIG. 3 is a status diagram illustrating transitions of statuses in a status memory in the first embodiment of the present invention.

In an initial state, since all data are in the main memory and not in the caches in the CPUs, the owned status memory 4 indicates an "all owned status". When the CPUs start a cache fill operation and a "cache coherent read and invalidate" access is started on the system bus 11, as shown in FIG. 3, the data for one line (which normally contains 32 bytes) enter the unowned status. So the status bit of the corresponding address in the owned status memory 4 is rewritten by the status rewrite control portion 5 from the owned status (0) to the unowned status (1).

When a "cache coherent read" access is made to cache data in the owned status, no change occurs in the status of ownership. This is because only read is performed and no rewrite operation is performed. When the CPUs make a "cache invalidate" access on the system bus 11 thereafter to rewrite the data stored in the caches, as shown in FIG. 3, the status bits of the corresponding addresses are rewritten by the status rewrite control portion 5 from the owned status (0) to the unowned status (1). Other types of accesses from the CPUs ("cache coherent read" and "cache coherent write and invalidate") will not change the status of ownership and, therefore, the owned status memory 4 will not be rewritten.

On the other hand, when a "cache coherent write and invalidate" access is made to the cache data which have entered the unowned status, the cache data in all the CPUs are invalidated and valid data are written in the main memory 7. So the status rewrite control portion 5 rewrites the status in the owned status memory 4 from the unowned status (1) to the owned status (0). Other types of accesses from the CPUs ("cache invalidate", "cache coherent read", and "cache coherent read and invalidate") will not change the status of ownership and, therefore, the owned status memory 4 will not be rewritten.

Figure 5:
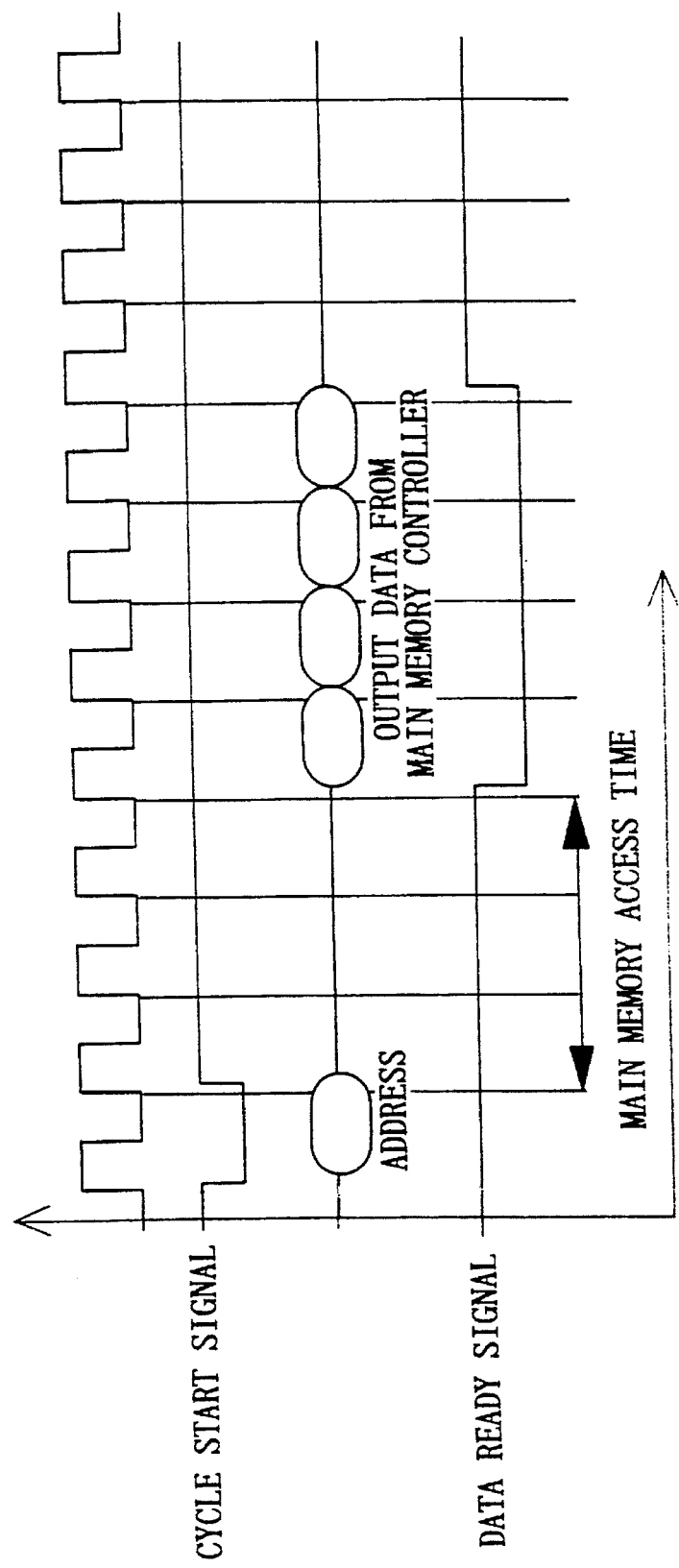
FIG. 5 illustrates the timing of a read access in a data owned status in the first embodiment of the present invention.

A description will now be made on the operation of the memory control portion 6 which is performed when a "cache coherent read" or "cache coherent read and invalidate" cycle takes place in the owned status. As shown in FIG. 5, the main memory controller in the present embodiment is able to know from the owned status memory 4 that the requested data are not stored in the other CPU for such a cycle. Therefore, no memory data invalidating signal is output from the other CPU and there is no need for waiting until the timing at which such a signal may be output (referred to as data invalidating signal output time). This limits the time required for transmitting data onto the system bus 11 to the time required for accessing the main memory 7 and eliminates unnecessary delay.

Figure 6:
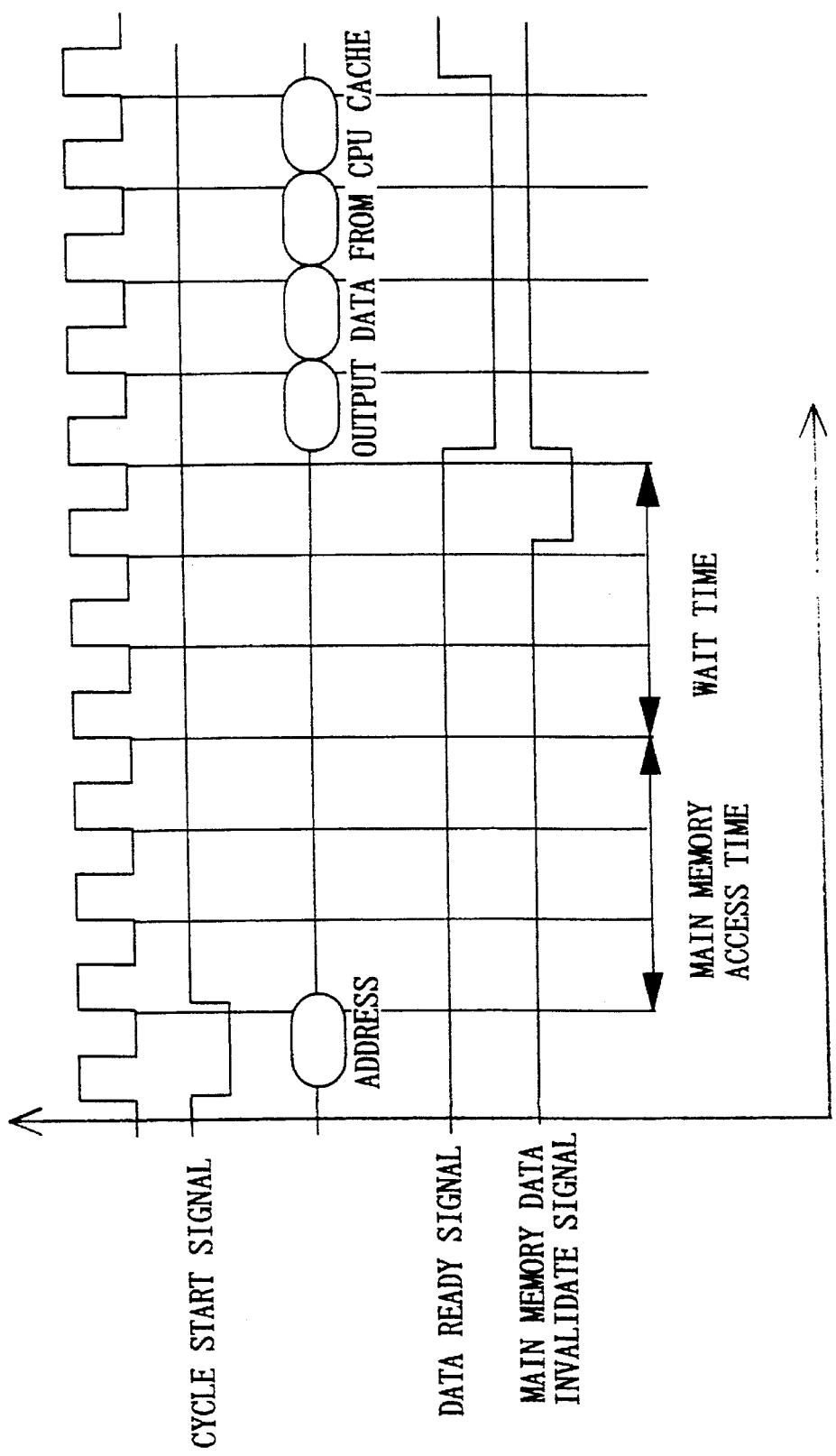
FIG. 6 illustrates the timing of a read access in a data unowned status in the first embodiment of the present invention.

For a "cache coherent read" or "cache coherent read and invalidate" cycle in the unowned status, as shown in FIG. 6, the fact that the other CPU keeps data can be known from the owned status memory 4. Since there is a possibility that a memory data invalidating signal is output from the other CPU, the main memory controller waits for the cycle during which the latest output of the signal may take place. If the signal is output, the data are also transmitted from the cache of the CPU thereafter. If the invalidating signal is not output, the main memory controller 20 must transmit the data.

Figure 4:
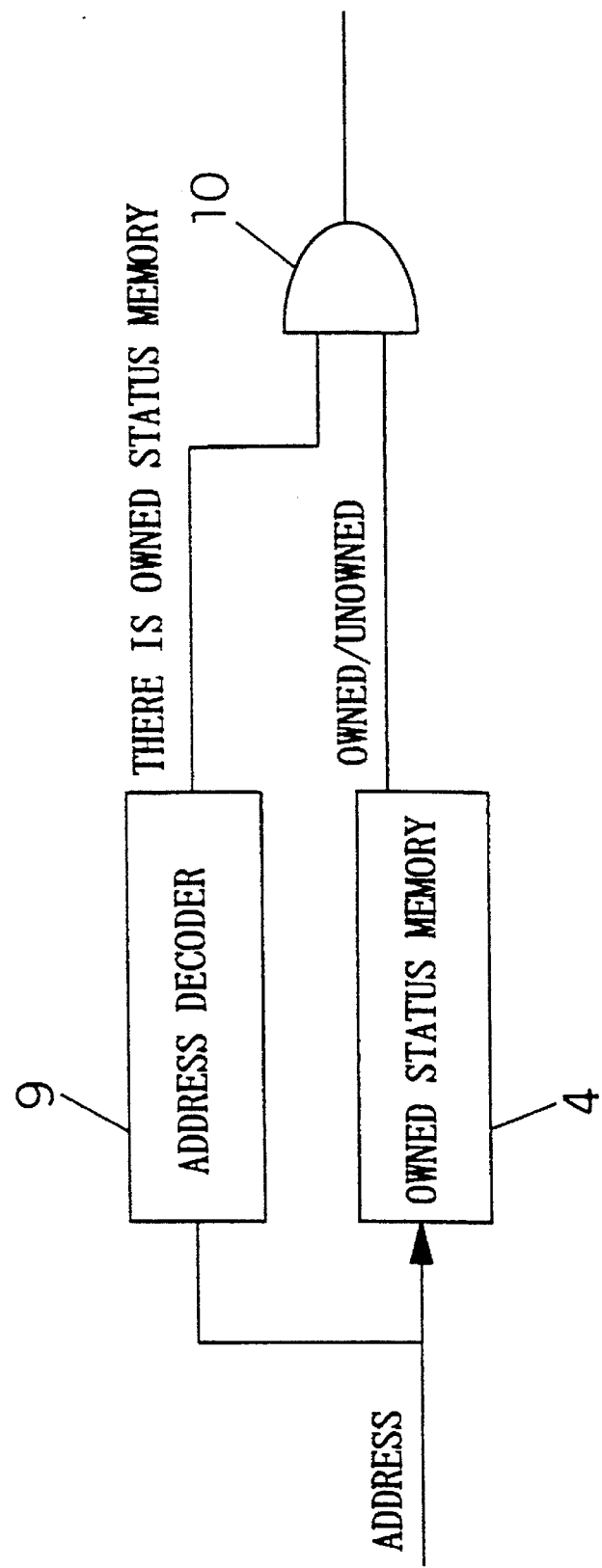
FIG. 4 is a block diagram of a portion for determining whether there is a status memory or not in a second embodiment of the present invention.

FIG. 4 is a block diagram illustrating an additional circuit for determining whether there is the owned status memory or not according to a second embodiment of the present invention. According to the method described so far, the capacity of the owned status memory 4 depends on the capacity of the main memory 7. It is therefore necessary to prepare the owned status memory 4 for the maximum possible memory capacity. In the present embodiment, however, an optimum capacity is reserved for the owned status memory 4 as shown in FIG. 4. If the main memory 7 is packaged in the excess of the capacity which can be stored by the owned status memory 4, an access to the address space which is not stored is detected by an address decoder 9 the output of which allows such a space to be always determined to be in the unowned status making it possible to maintain normal operations.

As described above, the main memory controller according to the present invention can output data to the system bus at the access speed of the main memory during a read cycle for data which are not stored in the cache memory of any CPU. In other words, data transfer is performed without waiting for a main memory data invalidating signal from a CPU which will never be output. This makes it possible to transfer data at the access speed of the main memory. Thus, it is not necessarily required to increase the capacity of the owned status memory, and the capacity of the main memory can be easily increased and decreased.

Although the number of the CPUs is two in the above description of the embodiments, the present invention is not limited thereto and it goes without saying that one CPU or three or more CPUs may be used.

Although CPUs have been described as an example of a means for accessing the system bus in the above embodiments, the present invention is not limited thereto and other means such as an I/O controller may be used.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A main memory controller comprising:

a status memory for storing owned and unowned statuses, in a main memory and a cache memory, of data associated with an access operation to a system bus connected to at least one CPU having a cache memory and performed by an access means of such CPU, a memory control portion which is responsive to signals indicative of the stored statuses for reading the data in the main memory before a time for outputting a data invalidating signal from said cache memory elapses in the case of the owned status, and for reading the data in the cache memory after said data invalidating signal is output in the case of the unowned status, and a status rewrite control portion for monitoring accesses to the system bus and for rewriting the status in said status memory according to a result of the monitoring.

2. The main memory controller according to claim 1, comprising an address decoder for decoding a valid address range of said status memory so that the capacity of said status memory can be maintained constant regardless of an increase in the capacity of the main memory and so that the same operation as that in the unowned status can be performed for invalid addresses in said status memory.

3. A main memory controller comprising:

a status memory for storing owned and unowned statuses, in a main memory and a cache memory, of data associated with an access operation to a system bus connected to at least one CPU having a cache memory and performed by an access means of such CPU, a memory control portion which is responsive to signals indicative of the stored statuses for reading the data in the main memory before a time for outputting a data invalidating signal from said cache memory elapses in the case of the owned status and for reading the data in the cache memory after said data invalidating signal is output in the case of the unowned status, and a status rewrite control portion for monitoring an access operation and for rewriting the status, in said status memory, according to the access operation monitored and a status which is before said rewriting in said status memory.

4. The main memory controller according to claim 3, comprising an address decoder for decoding a valid address range of said status memory so that the capacity of said status memory can be maintained constant regardless of an increase in the capacity of the main memory and so that the same operation as that in the unowned status can be performed for invalid addresses in said status memory.

* * * * *